United States Patent
Hartelius

(10) Patent No.: US 10,299,462 B1
(45) Date of Patent: May 28, 2019

(54) COLLAPSIBLE PET HOUSE

(71) Applicant: Mark Hartelius, Orland park, IL (US)

(72) Inventor: Mark Hartelius, Orland park, IL (US)

( * ) Notice: Subject to any disclaimer, the term of this patent is extended or adjusted under 35 U.S.C. 154(b) by 17 days.

(21) Appl. No.: 15/273,883

(22) Filed: Sep. 23, 2016

Related U.S. Application Data

(60) Provisional application No. 62/222,418, filed on Sep. 23, 2015.

(51) Int. Cl.
*A01K 1/03* (2006.01)
*A01K 1/02* (2006.01)

(52) U.S. Cl.
CPC ............ *A01K 1/033* (2013.01); *A01K 1/0254* (2013.01)

(58) Field of Classification Search
CPC ............................. A01K 1/033; A01K 1/0254
USPC .......................................... 119/498, 496, 497
See application file for complete search history.

(56) References Cited

U.S. PATENT DOCUMENTS

| | | | | |
|---|---|---|---|---|
| 3,150,640 A | * | 9/1964 | Nevitt | A61D 3/00 119/416 |
| 3,596,636 A | * | 8/1971 | Stobaugh | A01K 13/001 119/174 |
| 4,977,857 A | * | 12/1990 | Slawinski | A01K 1/0254 119/497 |
| 5,170,745 A | * | 12/1992 | Burdette, Jr. | A01K 1/0254 119/497 |
| 5,645,096 A | * | 7/1997 | Hazinski | E04H 15/40 135/115 |
| 6,848,460 B2 | * | 2/2005 | Zheng | E04H 15/324 135/126 |
| 2006/0037553 A1 | * | 2/2006 | Miller | A01K 1/0254 119/497 |
| 2008/0066686 A1 | * | 3/2008 | Lockwood | A01K 1/033 119/28.5 |
| 2010/0242856 A1 | * | 9/2010 | Willard | A01K 1/033 119/499 |
| 2011/0132274 A1 | * | 6/2011 | Cagle | A01K 1/0245 119/498 |
| 2011/0203528 A1 | * | 8/2011 | Northrop | A01K 1/0254 119/497 |
| 2012/0186533 A1 | * | 7/2012 | Lu | A01K 1/0254 119/497 |
| 2013/0180463 A1 | * | 7/2013 | Messner | A01K 1/0353 119/498 |

(Continued)

*Primary Examiner* — Son T Nguyen
(74) *Attorney, Agent, or Firm* — Robert W. J. Usher

(57) ABSTRACT

A conical cat house collapsible flat for washing and storage is formed from an elongate strip of sheet form material with lands of identical size at respective opposite ends and joined together by an intermediate bridging portion. One land has a pet access aperture. A zipper extends along the strip edges for progressively drawing edges of the strip together, folding up the strip to a completely enclosed, conically walled pet house with the one land forming an upstanding front conical wall, exposing the aperture for pet access and, the intermediate portion forming an upstanding rear wall and the other land forming a bottom/base. The lands are part-circular and respective opposite free edges of the intermediate bridging portion extend in parallel relation tangentially from edge portions of respective lands on respective opposite sides of the strip and join respective lands at respective re-entrant portions such that the erected pet house is wedge-shape.

4 Claims, 2 Drawing Sheets

(56) References Cited

U.S. PATENT DOCUMENTS

2014/0230746 A1* 8/2014 Chapman ............. A01K 1/0254
  119/453
2017/0118950 A1* 5/2017 Xu ....................... A01K 1/0353

* cited by examiner

COLLAPSIBLE PET HOUSE

RELATED APPLICATIONS

Priority is claimed from my provisional application 62/222,418, filed Sep. 23, 2015, the disclosure of which is incorporated herein by reference.

FIELD OF THE INVENTION

The invention relates to a pet house, particularly for cats, that can be erected and collapsed, quickly and easily.

BACKGROUND OF THE INVENTION

Pet houses should both be able to be cleaned frequently, preferably by using a domestic washing machine, and easily transportable for carrying the pet from place to place during vacations etc.

The prior art discloses a variety of cat tube toys and, in particular, a rectangular sheet of material with engageable teeth of a zip fastener mechanism extending along one pair of opposite edges enabling those edges to be folded up and secured together to form a cat-admitting tube open at opposite ends so that the cat can rest with its body extending along the tube between the open ends.

Although the fastener can be unzipped to revert to the sheet-form for convenient washing and compact storage, the toy tube is not suitable for a cat house as not providing sufficient room for a mature cat to turn around or, security for carrying, as both opposite ends remain open.

SUMMARY OF THE INVENTION

Accordingly, the invention provides a pet house that can be erected and collapsed, by folding and unfolding an elongate strip of material by manipulating only a single zip fastener which extends around a peripheral edge.

More particularly, the elongate strip has lands of identical size at respective opposite ends, one land being formed with a pet access aperture and the lands being joined together by an intermediate bridging portion; a zip faster mechanism with a sliding clasp and zipper teeth extending completely around the edges of the strip; such that, to in erecting the pet house from a strip in flat position, moving the sliding clasp along the teeth from a re-entrant portion progressively draws the edges of the strip together, folding/bending up the strip to form a completely enclosed, conically walled pet house with the pet aperture positioned in a front conical wall, upstanding for pet access and, the intermediate portion forming a rear and the other land forming a bottom/base.

Unzipping, by moving the sliding clasp in a reverse direction, releases the edges to return to a flat position for cleaning and washing in an washing machine or for packing or folding to a smaller, flat configuration for transportation.

Preferably, the lands at respective opposite ends of the strip are part-circular and respective opposite free edges of the intermediate bridging portion extend in parallel relation tangentially from edge portions of respective lands on respective opposite sides of the strip and join respective lands at respective re-entrant portions such that the erected pet house is wedge shape.

The strip comprises an interior layer of tricot and an exterior layer of nylon.

PARTICULAR DESCRIPTION

Figure 1:
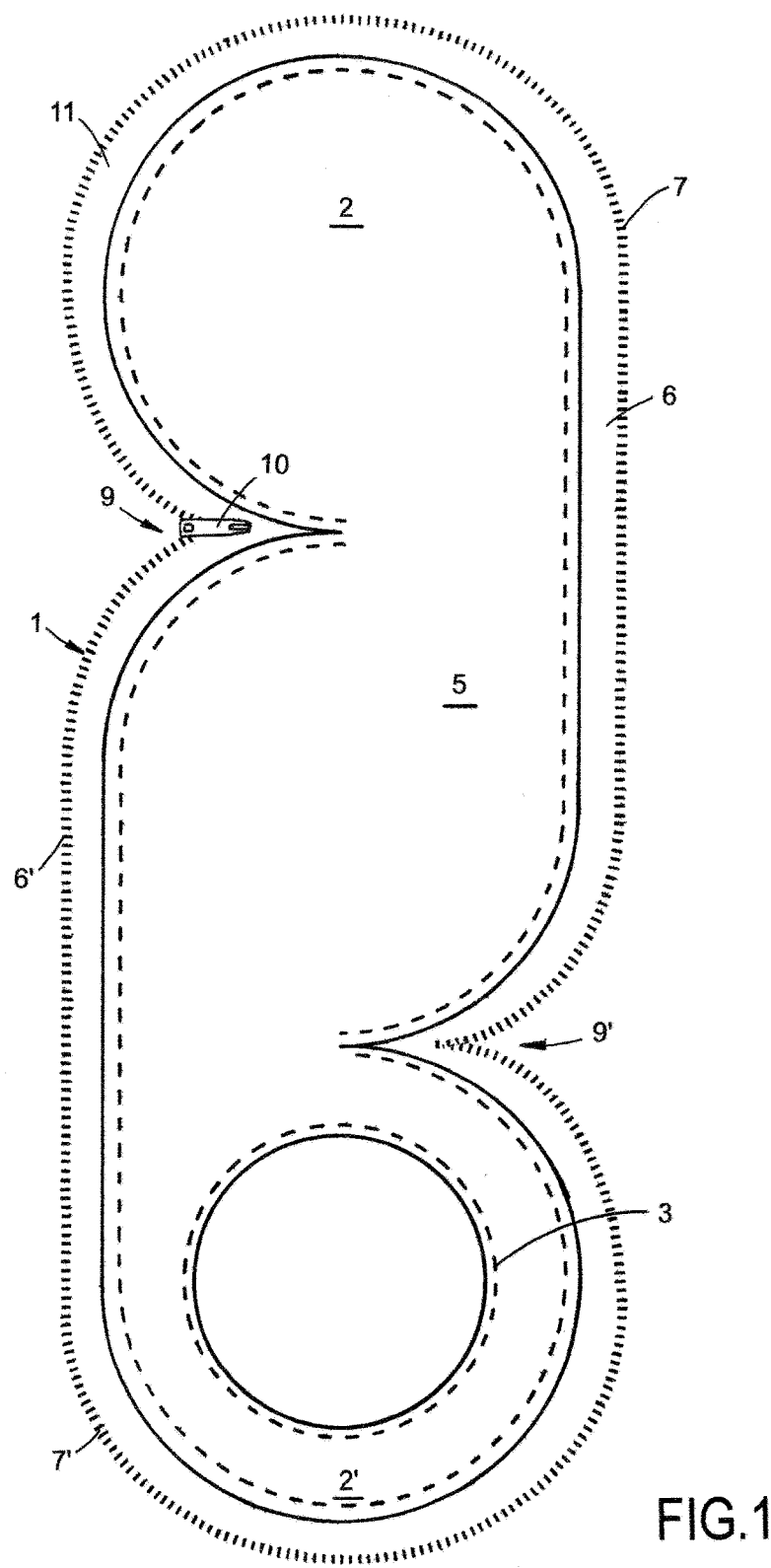
FIG. 1 is a plan view of the flat strip from which the pet-house is erected.

As shown in FIG. 1, the elongate strip 1 has circular lands 2, 2' of identical, part circular, shape and size at respective opposite ends, one of which 2 is formed with a pet access aperture 3. The lands are joined together by a bridging portion 5 having respective opposite free edges 6, 6' extending, respectfully, in parallel relation, tangentially from respective edge portions 7, 7' of respective lands 2, 2' on respective opposite sides of the strip and joining respective lands at respective re-entrant portions 9,9'. A zip faster mechanism with a sliding clasp 10 and zipper teeth 11 extends completely around the edges of the strip with the clasp positioned in either re-entrant portion 9 or 9' when fully unzipped, (i.e. in the starting position) The strip, including the intermediate bridging portion, has no greater width than a diameter of either of the circular lands and the zipper teeth and is without any lateral extension.

Figure 2:
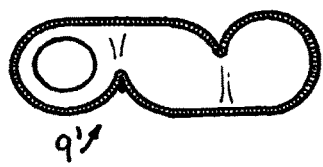
FIGS. 2, 3, 4, 5 and 6 are, respectively, diagrammatic perspective views showing progressive stages of erection commencing with the zipper clasp in the alternative position to that of FIG. 1.
Figure 3:
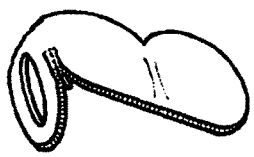
Figure 4:
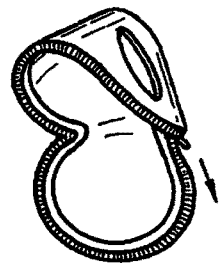
Figure 5:
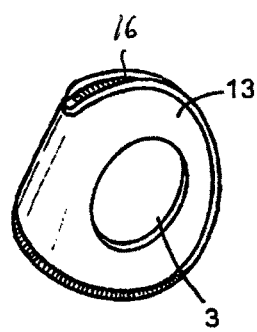
Figure 6:
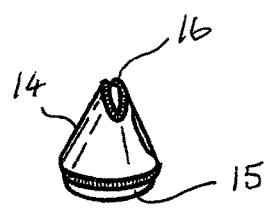

To erect the cat-house from the strip in flat position, (with the clasp commencing in the alternative position in re-entrant portion 9' as shown in FIG. 2, (adjacent the pet opening), the progressive movement of the teeth into engagement, progressively drawing the edges of the strip together, (initially, edges of the land and one side of the bridging portion and finally the remaining edges of the other land and the other side of the bridging portion), bending up the strip and forming a completely enclosed, conical, wedge shape, cat house with the pet aperture 3 positioned in an upstanding, front conical wall portion 13 formed by the one land, for cat access, the bridging portion 5 forming an upstanding rear wall 14 and the other land forming a base/bottom 15.

Sliding the clasp in a reverse direction releases the edges to return the strip to a flat position.

As the cat-house is wedge shape, it may readily be carried by the pet owner with the cat inside simply by grasping the narrow top (peak) 16.

Thus, the pet house can be erected and collapsed flat for cleaning, compact storage or transportation when unoccupied, by folding and unfolding an elongate strip of material simply by zipping and unzipping a single zip fastener which extends completely around a peripheral edge.

The invention claimed is:

1. A collapsible pet cat house comprising:
an elongate strip of sheet form material with circular lands of identical size at respective opposite ends and joined together by an intermediate bridging portion;
respective opposite free edges of the intermediate bridging portion extend in parallel relation tangentially from first edge portions of respective lands on respective opposite sides of the strip and join respective lands at respective re-entrant portions at second, opposite edges of the strip;
a pet access aperture formed in one land of said lands;
a zip faster mechanism with a sliding clasp and zipper teeth extending completely around peripheral edges of the strip the strip, including the intermediate bridging portion, has no greater width than a diameter of either of the circular lands and the zipper teeth and is without any lateral extension; and
the strip being entirely flat with all surfaces exposed for washing;

whereby, in erecting the pet house from the strip in flat position the sliding clasp can be moved along the teeth completely around peripheral edges of the strip so that the edges of the strip are progressively drawn together and the strip folded/bent up to form a completely enclosed, conical wedge pet house having an upstanding front wall formed by the one land with the aperture exposed for pet access; an upstanding rear wall formed by the intermediate portion; a bottom/base formed by the other land; and a narrow peak which provides a handle for grasping by a person carrying the pet house.

2. A collapsible pet cat house according to claim 1 wherein, when fully unzipped, the sliding clasp is positioned in a re-entrant portion defined by a juncture of the one land having the pet access aperture and the bridging portion.

3. A collapsible pet cat house according to claim 1 in which the strip has a length of 44 inches and each land has a diameter of 14 inches.

4. A collapsible pet cat house according to claim 1 wherein the strip consists essentially of an interior layer of tricot and an exterior layer of nylon.

\* \* \* \* \*